United States Patent
Khasin

(10) Patent No.: US 7,689,404 B2
(45) Date of Patent: Mar. 30, 2010

(54) METHOD OF MULTILINGUAL SPEECH RECOGNITION BY REDUCTION TO SINGLE-LANGUAGE RECOGNIZER ENGINE COMPONENTS

(76) Inventor: Arkady Khasin, 220 High St., Acton, MA (US) 01720

(*) Notice: Subject to any disclaimer, the term of this patent is extended or adjusted under 35 U.S.C. 154(b) by 1358 days.

(21) Appl. No.: 10/906,376

(22) Filed: Feb. 16, 2005

(65) Prior Publication Data
US 2005/0187758 A1 Aug. 25, 2005

Related U.S. Application Data

(60) Provisional application No. 60/521,130, filed on Feb. 24, 2004.

(51) Int. Cl.
G06F 17/20 (2006.01)
(52) U.S. Cl. .............. 704/1; 704/242; 704/252
(58) Field of Classification Search .......... 704/255, 704/277, 256, 231, 251, 254, 1, 2, 9, 10, 704/238, 242, 240, 256.4, 256.5, 3, 235
See application file for complete search history.

(56) References Cited

U.S. PATENT DOCUMENTS

| | | | |
|---|---|---|---|
| 4,829,575 A * | 5/1989 | Lloyd | ............ 704/238 |
| 5,712,957 A | 1/1998 | Waibel et al. | |
| 5,754,978 A | 5/1998 | Perez-Mendez et al. | |
| 5,799,278 A | 8/1998 | Cobbett et al. | |
| 5,805,771 A | 9/1998 | Muthusamy et al. | |
| 5,991,719 A | 11/1999 | Yazaki et al. | |
| 6,006,221 A | 12/1999 | Liddy et al. | |
| 6,061,646 A | 5/2000 | Martino et al. | |
| 6,085,160 A * | 7/2000 | D'hoore et al. | ........... 704/256.2 |
| 6,212,500 B1 | 4/2001 | Kohler | |
| 6,321,197 B1 | 11/2001 | Kushner et al. | |
| 6,549,883 B2 | 4/2003 | Fabiani et al. | |
| 6,584,439 B1 | 6/2003 | Geilhufe et al. | |
| 6,598,017 B1 | 7/2003 | Yamamoto et al. | |
| 6,912,499 B1 * | 6/2005 | Sabourin et al. | ............. 704/243 |
| 7,149,688 B2 * | 12/2006 | Schalkwyk | ................ 704/255 |
| 2002/0173945 A1 | 11/2002 | Fabiani et al. | |

* cited by examiner

*Primary Examiner*—Huyen X. Vo
(74) *Attorney, Agent, or Firm*—Kenneth F. Kozik

(57) ABSTRACT

In some speech recognition applications, not only the language of the utterance is not known in advance, but also a single utterance may contain words in more than one language. At the same time, it is impractical to build speech recognizers for all expected combinations of languages. Moreover, business needs may require a new combination of languages to be supported in short period of time. The invention addresses this issue by a novel way of combining and controlling the components of the single-language speech recognizers to produce multilingual speech recognition functionality capable of recognizing multilingual utterances at a modest increase of computational complexity.

14 Claims, 4 Drawing Sheets

| Word's spelling | |
|---|---|
| Language 1 mark | Pronunciation 1 |
| Language 2 mark | Pronunciation 1 |
| Language 2 mark | Pronunciation 2 optional |
| ....... | ..... |
| Language L mark | Pronunciation k |

Fig. 1 ns. More specifically, the invention is a
METHOD OF MULTILINGUAL SPEECH RECOGNITION BY REDUCTION TO SINGLE-LANGUAGE RECOGNIZER ENGINE COMPONENTS

FIELD OF THE INVENTION

The invention relates to systems and methods of automatic speech recognition. More specifically, the invention is a method of multilingual speech recognition capable of recognizing utterances, which may be by themselves multilingual. The method utilizes existing components of single-language speech recognizers by combining and controlling them in such a way that multilingual speech recognition results.

DESCRIPTION OF PRIOR ART

There is a growing demand for speech recognition applications supporting several languages simultaneously. Not only does the language of an utterance to be recognized is not known in advance, but also the language may be changed during the utterance. The following are some examples of voice-activated applications where this may be the case.

1. Dictation/Transcription: Consider English phrases like "He's lately been 'hundemuede'" or "As the French say, C'est la vie."

2. Name lookup/Name dialing: Consider commands like "Display Richard the Third," "Display Richard Strauss," "Display Richard the Rocket." In each case, "Richard" is likely to be pronounced differently per English, German and French tradition respectively, yet there is no way of predicting the pronunciation based on the spelling. Moreover, it is not uncommon for a person to have the first and the last names coming from different language backgrounds, so even the full name in a contact database may by itself be a multilingual phrase.

3. Device navigation: Consider, e.g., a command to start an application by filename, where the command itself is spoken in a native language (e.g., Chinese) and the filename in the language of the vendor or of the operating system (e.g., English). This is an example of an application where the languages (but perhaps not the accents) are completely independent.

Prior art addresses multilingual recognition problems in one of the following ways:

1. Requiring the application to pre-specify the language before the recognition can occur;

2. Determining the language based on a small vocabulary of, essentially, wake-up, or activation, commands, and selecting this language for the main utterance;

3. Running a plurality of single-language recognizers in parallel and declaring the best overall hypothesis the recognition result;

4. Creating a complete multilingual recognizer based on a "Holy Grail" model, encompassing all languages, for example, all universal phonemes.

Method (1) does not detect the language automatically and does not support multilingual utterances.

Method (3), either, cannot handle utterances inside which the language change occurs. Besides, it is computationally inefficient: its execution time is the sum of execution times of individual recognizers.

Method (2) cannot support multilingual utterances or a language switch between the activation command and the main utterance.

Strictly speaking, method (4), (e.g., of which U.S. Pat. No. 5,799,278 to Cobbett et al., U.S. Pat. No. 6,212,500 to Kohler) has the correct approach. However, from a product standpoint, the method in general suffers from two related major drawbacks:

First, the models of words in the vocabulary (such as phoneme-based acoustic models and language models, if any) must cover all supported languages. Those models necessarily become rather large. When adding support for a new language, the models must be rebuilt to reflect training data for the new language.

Second, the approach doesn't scale well. Business needs may call in short order for a product supporting an arbitrary subset of generally supported languages. Dropping some languages may be mandatory in order to reduce the memory footprint and execution time of the combined recognizer and perhaps to improve the recognition quality. However, this requires re-training the models. Besides, the number of such custom-tailored projects grows combinatorially with the number of generally supported languages and is very difficult to maintain.

SUMMARY OF INVENTION

The invention relates to systems and methods of automatic speech recognition. More specifically, the invention is a method of multilingual speech recognition capable of recognizing utterances, which may be by themselves multilingual. The method utilizes existing components of single-language speech recognizer engines by combining and controlling them in such a way that multilingual speech recognition results.

A new component, the multilingual dispatcher (MLD) envelops language-independent components and invokes language-specific components to perform language-dependent processing. Moreover, language-specific components themselves are not affected when a language is added to or deleted from the project; a language support works like a replaceable plug-in. Such a structure enables scalable deployment of any subset of supported languages in short order.

The key elements of the invention are:

a heuristic way to make numeric scores of hypotheses (such as Viterbi scores) comparable even if produced by different language-specific recognizers;

a heuristic way of propagation of (seeding) a hypothesis from a hypothesis in a different language.

BRIEF DESCRIPTION OF DRAWINGS

FIG. 1 shows a logical representation of a recognition vocabulary. The MLD does not know the format in which the pronunciations (as models of the word) are stored.

FIGS. 2 and 3 illustrate how the MLD accesses language-specific components:

FIG. 2 shows a flowchart of the vocabulary builder adding a new word. Depending on the application, this procedure can be performed in advance or on the fly as needed.

FIG. 3 shows a flowchart of the state update procedure for the new slice of speech.

DETAILED DESCRIPTION

Figure 2:
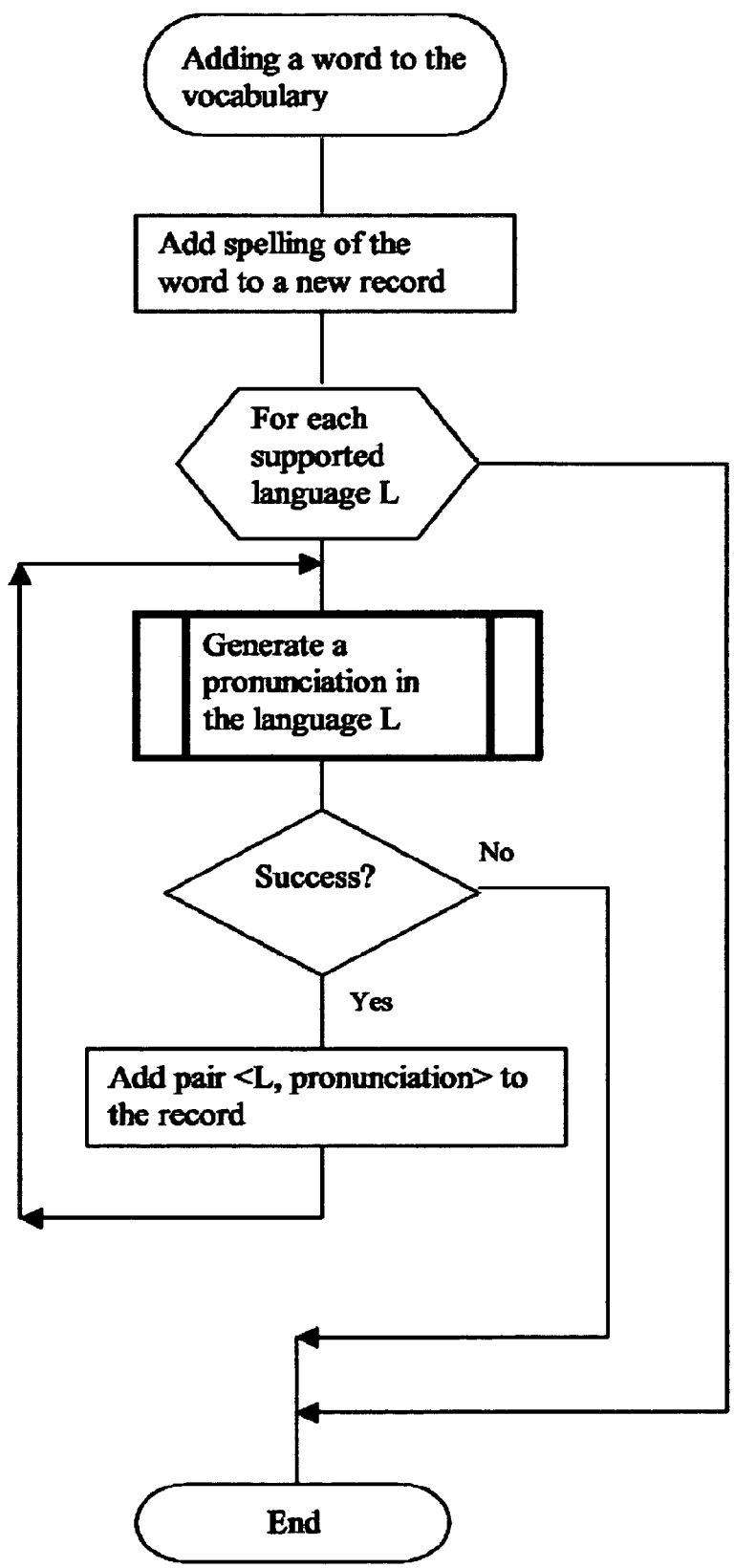
In FIG. 2 on, boxes with bold borders represent existing, usually language-specific, components.

The invention combines and controls existing common components of language-specific speech recognition engines that implement vocabulary-based recognition whereby each word is equipped with one or more pronunciations and each pronunciation's runtime state (hypothesis) is represented during recognition as required by the language, but so that it contains an exit state comprising the current score of the pronunciation and history information sufficient to retrieve the best (lowest-score) utterance ending in this pronunciation.

NOTE: The term "pronunciation" is used here without any particular connotation to mean the model of a written word appropriate for a given language-specific recognizer.

Those versed in the art will immediately see that a popular Hidden Markov Model scheme falls in this class. In HMM, a pronunciation's state is a directed graph of states of phonetic elements of the pronunciation, and the terminal states of the graph are the exit states of the pronunciation. Also, in HMM, the score has the semantics of (scaled) log-likelihood.

Also, it is outside of scope of the proposed invention to specify how exactly the language-specific pronunciations are generated. However, those versed in the art know that it can be, for example, a pre-built or updateable dictionary, or some sort of pronunciation guessing engine, or a combination thereof.

According to the invention, recognition of an utterance is performed on a combined vocabulary, where each word is equipped with at least one pronunciation for each language in which the word is allowed. Each pronunciation is marked with (or otherwise knows) the language it is in.

The invention comprises the multilingual dispatcher (MLD) controlling a set of existing language-specific components:

Pronunciation generator, which, given a spelling, produces a set of pronunciations in a format sufficient to produce word models with distinct initial and exit states;

Pronunciation state update mechanism which is capable of pruning the unlikely states using an externally supplied threshold and producing the next pruning threshold;

Feature vector converter which transforms current slice of speech into the feature vector in the language-specific format;

Pronunciation seeding component, which effectively computes, in a computing system, the entry state of a pronunciation's model by iterating over the exit states supplied to the seeding component (such as taking the exit state with the minimum score adjusted by an appropriate language model, if any). The computing system can include at least a processor, memory, text and audio input devices and a text input device.

The MLD builds a vocabulary in a form semantically equivalent to containing, for each word, the following information:

Spelling;

A pair <Language Id, pronunciation> for all languages supported and perhaps with more than one pair for a given language. The format of a pronunciation is known to the appropriate language-specific component but is unknown to the MLD.

This is illustrated in FIG. 1. Those versed in the art know that in some cases substantial computational benefits may be achieved by storing pronunciations in compacted data structures, such as lexical trees. This is not essential for the MLD as long as the information shown in FIG. 1 can be recovered.

Depending on the application, the recognition vocabulary can be built off-line, before the product is shipped (e.g., closed command-and-control applications) or online on as-needed basis (e.g., when synchronizing with a contact database in a PDA).

FIG. 2 illustrates a process of adding a new word to the vocabulary. (From FIG. 2 on, boxes with bold borders represent existing, usually language-specific, components.) For the recognition phase, the MLD needs a way to compare exit scores of pronunciation hypotheses in different languages: since single-language recognizers are independent, the scores produced by them may not be directly comparable.

To address this issue, the MLD employs a separate score format and, for each language, a function converting the language-specific score to the MLD score. The exact nature of this function depends on the single-language recognition engine involved; in general, it is a best-fit statistically derived function. The basis for the best-fit problem is a heuristic criterion that MLD scores of certain hypotheses on qualified utterances be equal (in least-squares or similar statistical sense). More specifically, the training set should contain noise "utterances" according to the application requirements (such as a mixture of car, airport and babble noise of varied duration). The hypotheses that need to score equally are universally present silence hypotheses in all languages and, if present, noise hypotheses. (To resolve ambiguity, one selected language score may be postulated to be equal to the MLD score.) By the way of illustration, the score-converting function can be as simple as scaling the language-specific score S with a language L specific factor $k(L)$: MLD_score=$k(L)*S$. From now on, this simple form will be used for the sake of clarity.

Speech processing usually involves a language-independent feature extraction (such as computing cepstral coefficients from the slice of speech) and a language-specific computing of the "feature vector" (such as applying an LDA transformation to the language-independent features). The MLD invokes an existing language-independent component to produce the language-independent features F and then, for each active language L, invokes an existing language-specific component to convert F to the language-specific format $F(L)$, as illustrated in the flowchart depicted in FIG. 3.

Figure 3:
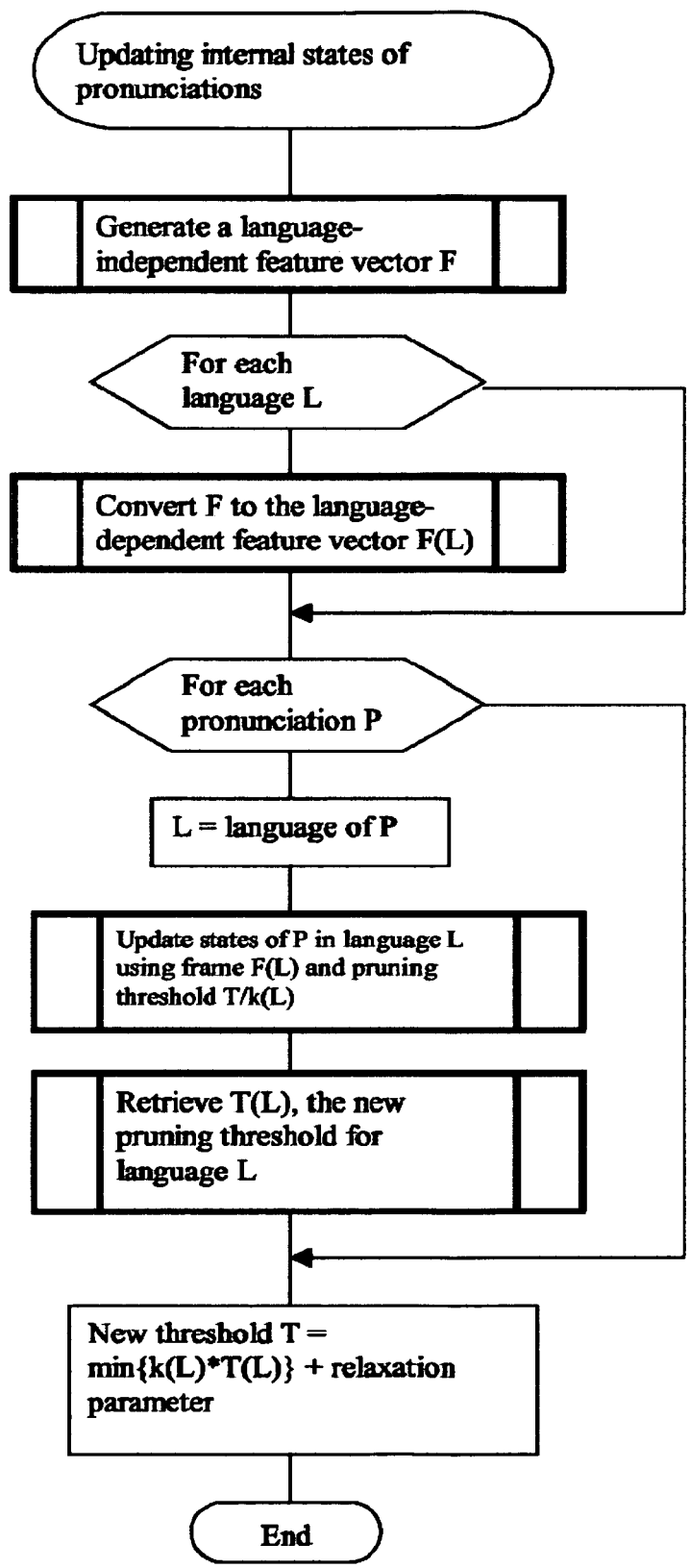

Then, as shown on FIG. 3, the MLD processes all active pronunciations. For each active pronunciation P (accessed through the recognition vocabulary), its language $L=L(P)$ is retrieved and the language L specific update component is invoked. Parameters that the MLD passes to the language-specific update component are the pronunciation P, the feature vector $F(L)$ corresponding to the language L and the pruning threshold T transformed to the language L score format, $T/k(L)$.). The language-specific update component is responsible for update of active states and also for update and propagation of the language-specific silence model(s). Thus, the initial silence manipulation is encapsulated within the language-specific component and not exposed to the MLD.

At the end of the update process, for each language, the result of computations is the same as if only that language's recognizer component was run. In particular, the new value of the pruning threshold, $T(L)$, is computed. The MLD retrieves $T(L)$ for each language L and computes the new threshold value (in the MLD score format) as the smallest language-specific threshold, $T=\min\{k(L)*T(L)\}$, which may be relaxed by a tuning parameter as shown on FIG. 3.

Those versed in the art know that the state (hypotheses) update is a computationally expensive operation, and so it is common practice to prune away (internal) states based on a dynamically varying score threshold as unlikely and to update only remaining (active) states and the states immediately reachable from them. Within the framework of the invention, the over-the-threshold pruning of active states is occurring for all pronunciations (and thus all languages) together, against a common threshold. Typically, this means that the number of active states is significantly smaller than the sum of active states if individual language engines were to run independently. (In other words, unlikely languages will prune away.) This results in reduction of computational complexity.

It is a commonly used mechanism of chaining the words in the utterance recognition that an exit state of each pronunciation can "seed" or "propagate to" another pronunciation's entry state as an active hypothesis with appropriate score. (E.g., in the HMM setting, the initial state(s) of the pronunciation's graph are seeded to be the current least-score seeding state where the score may be adjusted, say, per language model.) In a single-language environment, this happens according to the (application-dependent) grammar rules and/or language model. The invention extends this mechanism to multilingual utterances.

Figure 4:
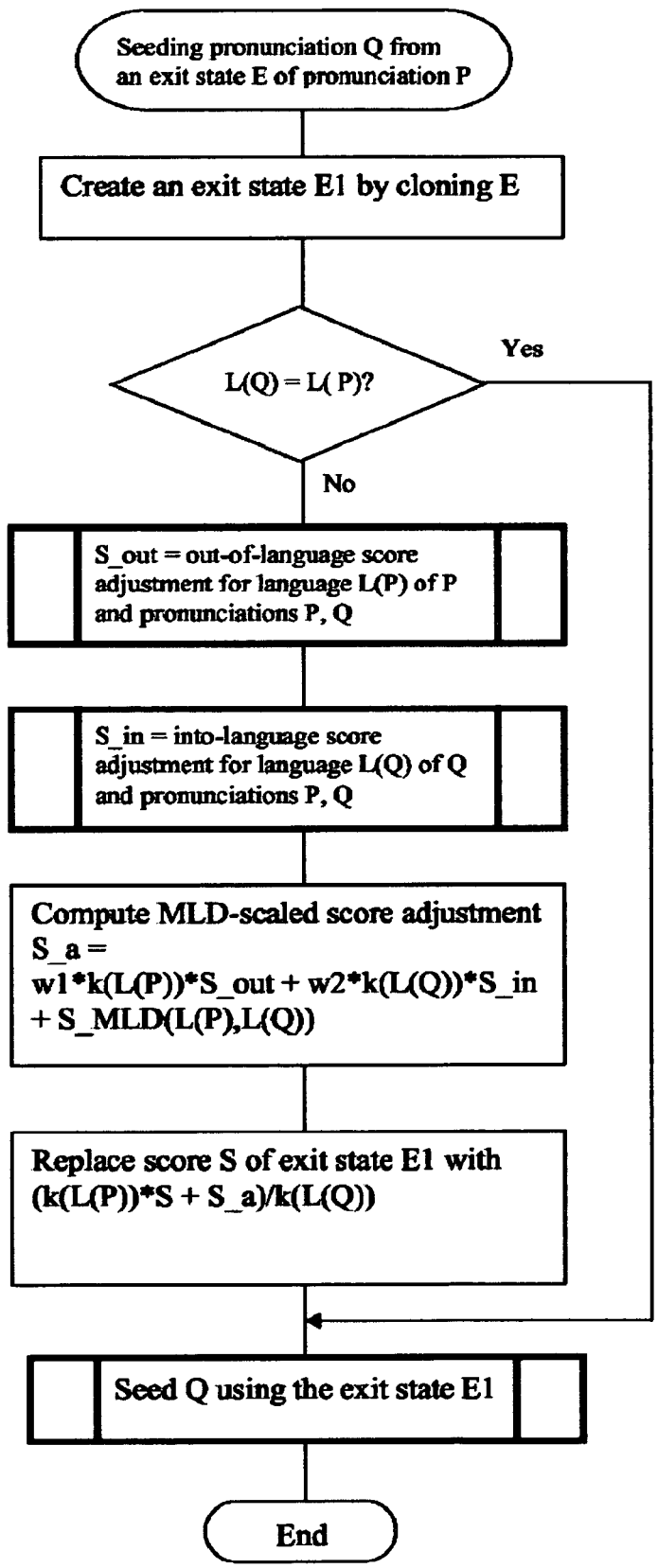
FIG. 4 shows a flowchart of seeding a pronunciation by an exit state of another pronunciation. There, L(P) denotes the language corresponding to the pronunciation P.

Consider an exit state E of pronunciation P in the language L(P) seeding a pronunciation Q in the language L(Q) (see FIG. 4). If the pronunciation which is being seeded (Q) and the seeding exit state's pronunciation (P) belong to the same language (i.e., L(P)=L(Q)), that language's seeding rules and algorithm apply. The MLD merely invokes the language-specific seeding component.

Otherwise, if the languages L(P) and L(Q) are different, the MLD makes a heuristic adjustment to the score of the seeding exit state E of pronunciation P. In short, the score adjustment involves adding adjustments from the language-specific components, if available, and the MLD's own adjustments. The detailed description follows.

Language-specific recognizers may have each a component to quantify score "price" of switching (a) to and (b) from a different language and in general dependent on the pronunciations and the history involved. The following examples illustrate this notion.

Example 1

Language-specific recognizers are equipped with class-based language models and the classes themselves are language-independent. In this case, language score penalties for the seeding pronunciation P are the score penalties for going from the class of word of P to the class of word of Q. For the language L(P) of P this is the from-language score (in the L(P) scale and computed with L(P) class transitions); for the language L(Q) of the pronunciation Q this is the to-language score (in the L(Q) scale and computed with L(Q) class transitions).

Example 2

In all languages, the class model has a class for a generic foreign-language word. Alternatively, a commonly used "generic word" class may be used for a foreign-language word. In these two cases, classes need not be the same across languages.

In general, the MLD assumes that a language-specific facility exists for each language, which produces out-of-language score adjustment $S\_out$ and into-language score adjustment, $S\_in$, given the pronunciations P, Q and the exit state E. (In applications where such a facility is not available, $S\_out$ and $S\_in$ are always zeros.) The MLD computes the score adjustment (in the MLD score scale) as a weighted average of $S\_out$ and $S\_in$: $w1*k(L(P))*S\_out+w2*k(L(Q))*S\_in$, where the weight coefficients $w1$ and $w2$ are tuning parameters owned by the MLD. To be consistent with seeding a same-language pronunciation, the sum of the weights should be a 1.

In addition, the MLD uses a "meta-language model" that provides a score adjustment $S\_MLD=S\_MLD(L1,L2)$ for switching between any two languages L1 and L2 regardless of the specific pronunciations involved. In analogy with class-based language models, the whole language is thus can be though of as a "meta-class" with score adjustments for transitions between any two languages.

This meta-language model is thus a set of parameters owned and tuned by the MLD. Since the number of those parameters is rather large (and thus hard to tune), it is preferred that such parameter be the sum of out-of-language adjustment and into-language adjustment. This would leave two parameters per language to tune, independently of the number of languages. In some applications, a single parameter may suffice. These simplifications are worth mentioning but they are not essential to the invention.

Summarizing, the MLD retrieves language adjustments $S\_out$ and $S\_in$ (FIG. 4) and computes the language adjustment $S\_a=[w1*k(L(P))*S\_out+w2*k(L(Q))*S\_in]+S\_MLD(L(P),L(Q))$.

and taking into account the score scales, the score S of the exit state E of the seeding pronunciation P is replaced with $(k(L(P))*S+S\_a)/k(L(Q))$. The MLD then invokes the seeding component specific to the language L(Q) of the pronunciation Q, which is being seeded (as shown on FIG. 4).

NOTE: Some applications employ application-dependent grammar rules prohibiting the seeding of a pronunciation in certain situations. In many cases, the grammar rules apply to the words of the recognition vocabulary rather than to their pronunciations and as such are language-independent. In cases where language-specific grammar rules do differ among languages, the grammar rules for multilingual phrases must be defined in addition to the language-specific grammars. This is an application level issue, and the MLD can handle it by invoking an application-dependent function. It is worth noting a special case where the multilingual grammar is reduced to the rules of the language L(Q) of the pronunciation Q that is being seeded. (An example of it is a language-independent grammar.) In this case, the language-specific grammar-checking component can be a part of the language-specific seeding component and not be exposed to the MLD (though this is computationally less efficient). This is why any grammar checking is omitted in FIG. 4.

The result of the recognition is the word sequence recovered from the exit state with the least MLD score among all exit states of all pronunciations in all languages at the moment when end of utterance is detected by existing means.

Coverage

The description above is concerned with a single pass of recognition. There exist multiple-pass speech recognizers. The invention of combining single-language recognizers into a multilingual recognizer applies to any or all passes of the of multiple-pass engines.

The invention applies equally to discrete- and continuous-speech recognition engines.

What is claimed is:

1. A method of speech recognition comprising:
providing a multilingual dispatcher engine in a computing system having at least a processor, a memory, text and audio input devices and a text input device;
providing individual components of language-specific single-language speech recognizers in the computing system; and
integrating the multilingual dispatcher engine in the computing system with language-independent functions and executing end-of-utterance detection and coordinating execution of the single-language recognizer components, the single-language recognizer components including at least a first component executed by the computing system to produce one or more language-specific word models for any given word in a recognition vocabulary, a second component executed by the computing system to compute a language-specific speech feature vector from a slice of acoustic data, a third component executed by the computing system to update a state of a word hypothesis by the latest computed feature vector, a language-specific pronunciation, and a facility to initialize a state, and a fourth component executed by the computing system to update a state of a word hypothesis by an exit state of any state of any word hypothesis as immediately preceding segment of an utterance, the fourth component referred to as seeding, the seeding comprising computing the entry state of a pronunciation's model by iterating over the exit states supplied to the seeding component, wherein coordination of execution comprises at least dispatching a step of recognition of a slice of speech, obtaining the scores of word hypotheses, cross-language seeding of word hypothesis and recovering the winning multilingual text from the winning word hypothesis at end of utterance.

2. The method of claim 1 wherein the multilingual dispatcher engine maintains a recognition vocabulary in which pronunciations of words in different languages are produced by executing corresponding language-specific components and storing the pronunciations in that said language's component format along with a means of recovering the producing language.

3. The method of claim 2 wherein the multilingual dispatcher engine maintains and updates runtime states of language-specific pronunciations by executing the language-specific state initialization and state update components against the language-specific format of a current feature vector.

4. The method of claim 3 wherein the multilingual dispatcher engine includes score scaling functions, which convert a hypothesis score from its language-specific scale to a multilingual dispatcher engine scale and from the multilingual dispatcher engine scale to a language-specific scale, these functions enabled as best-fit functions to generate equal multilingual dispatcher engine scores for silence and, optionally, noise hypotheses, in different languages on qualified application-dependent noise utterances.

5. The method of claim 4 wherein the language-specific recognizers include a component computing a score adjustment for switching to another language after a given pronunciation and a component computing a score adjustment for switching from another language before a given pronunciation.

6. The method of claim 5 wherein the multilingual dispatcher engine includes language-specific tunable parameters referred to as language switch penalties, one per pair of languages, for score adjustment when switching from and to a given language.

7. The method of claim 6 wherein the multilingual dispatcher engine updates the initial state of a pronunciation Q from an exit state of a pronunciation P in the same language by executing the corresponding language-specific component.

8. The method of claim 7 wherein the multilingual dispatcher engine includes updating the initial state of a pronunciation Q from an exit state L of a pronunciation P in a different language, the updating comprising:

creating in the computing system a temporary exit state by cloning the state L and converting its score to the multilingual dispatcher engine format;

determining in the computing system out-of-language of P score adjustment by executing the corresponding component of the language of P, if available, and converting it to the multilingual dispatcher engine format;

determining in the computing system into-language of Q score adjustment by executing the corresponding component of the language of Q, if available, and converting it to the multilingual dispatcher engine format;

adjusting in the computing system the score of the temporary exit state by adding a weighted average of out-of language and into-language score adjustments computed by the corresponding language-specific components when available;

adjusting in the computing system the score of the temporary exit state by adding the language switch penalty;

converting in the computing system the score of the temporary exit state into the format of the language of Q; and executing in the computing system the language-specific seeding component of the language of Q with the temporary exit state.

9. The method of claim 8 wherein the temporary exit state is not explicitly produced unless computationally efficient.

10. The method of claim 9 wherein the language specific recognizers comprise a facility to prune active states of pronunciations based on score threshold and the multilingual dispatcher engine controlling the pruning threshold of each individual recognizer, the controlling comprising:

determining the common prune threshold as the minimum of individual thresholds produced by said language specific recognizers, scaled to the multilingual dispatcher engine scale, relaxed by a tunable parameter; and dispatching a common pruning threshold to each said recognizer in the format scaled to the format of that recognizer.

11. The method of claim 10 wherein components common to all supported languages are factored out of language-specific recognizers and incorporated into the multilingual dispatcher engine.

12. The method of claim 1 wherein the computing system is embedded in a hand-held interactive device.

13. A method of speech recognition comprising:

in a memory of a computing system having a processor, text/audio input devices and a text output device, providing a multilingual dispatcher component and individual components of language-specific single-language speech recognizers in a memory executed by the computing system, the multilingual dispatcher component integrating language-independent functions and executing in parallel an end-of-utterance detection process and speech recognition process, the speech recognition process comprising:

processing a slice of acoustic data into a language-independent feature vector in the multilingual dispatcher component, dispatching the feature vector to each active single-language recognizer and receiving the language-specific feature vector from each recognizer;

dispatching in the multilingual dispatcher component the language-specific feature vectors each to its corresponding single-language recognizer to execute state update of word hypotheses by the corresponding recognizer;

obtaining in the multilingual dispatcher component word hypotheses numeric scores from each single-language recognizer and scaling them to an internal scale of the multilingual dispatcher component;

determining in the multilingual dispatcher component of the computing system a resulting numeric score of each word hypothesis as a least scaled score of a hypothesis among all single-language recognizers and, for the winning word hypothesis of each word, remembering the language that produced it;

dispatching in the multilingual dispatcher component the execution of updating each word hypothesis using all winning word hypotheses within, the updating referred to as seeding, and using each of the single-language recognizer components, wherein:

if the seeding state with the winning multilingual dispatcher component score belongs to the same language as the language of the recognizer then the built-in update facility of the recognizer is executed without modifications on the pair of the seeding and the seeded word hypotheses;

if the seeding state belongs to a different language, applying language transition adjustments to the seeding score in the multilingual dispatcher component format which is then resealed to the scale of the single-language recognizer and replaces the seeding score, after which replacement the single-language recognizer's built-in update facility is executed on the pair of the modified seeding and the seeded word hypotheses;

declaring in the multilingual dispatcher component the winning hypothesis at the end of utterance as the utterance ending with the winning word hypothesis, and recovering the words of the utterance along with the language of each word from back trace information associated with seeding.

14. The method of claim 13 wherein each of the language-specific single-language speech recognizers comprises a pronunciation model for the end-of-utterance word and the multilingual dispatcher component monitors end of utterance as the event of the end-of-utterance hypothesis having the overall winning multilingual dispatcher component score.

* * * * *